United States Patent Office 3,505,010
Patented Apr. 7, 1970

3,505,010
MANUFACTURE OF AMMONIUM BROMIDE AND CARBON MONOXIDE FROM POLYBROMOMETHANES
Henry W. Schiessl, Northford, Conn., assignor to Olin Mathieson Chemical Corporation
No Drawing. Filed Dec. 7, 1967, Ser. No. 688,669
Int. Cl. C01b 9/04, 31/20; C01c 1/16
U.S. Cl. 23—85                                                9 Claims

ABSTRACT OF THE DISCLOSURE

Polybromomethanes and mixtures containing them are reacted with aqueous ammonia at elevated temperatures and pressures to convert them substantially quantitatively to ammonium bromide and carbon monoxide.

---

This invention relates to the manufacture of ammonium bromide from polybromomethanes, from mixtures containing them and particularly from a mixture of polybromomethanes obtained as a by-product of the manufacture of alkali metal bromites and alkaline earth metal bromites. This by-product is unsalable in the quantities available and represents an economically unrecoverable loss of bromine which must be charged against the cost of manufacture of the bromites. This by-product also presents a disposal problem. The by-product is readily converted to ammonium bromide which is a useful and salable chemical form of bromine and it presents a credit to the bromite manufacture.

In the process for the commercial production of sodium bromite, sizeable quantities of a by-product mixture of polyhalogenated hydrocarbons is produced. This mixture consists mainly of bromoform and carbon tetrabromide, with smaller amounts of chlorotribromomethane and other chlorinated, brominated, and chlorobrominated hydrocarbons. The major constituents of this mixture, as well as the mixture itself, cannot currently be utilized in any practical applications in the quantities that are produced. This situation creates a problem of disposal, since these compounds cannot be discharged into waterways or into the air without creating serious pollution and attendant health hazards. Furthermore, these compounds represent a significant economic loss in the production of sodium bromite.

One object of this invention is to eliminate the problems of disposal and pollution created by the aforementioned mixture of halogenated hydrocarbons. A further object of this invention is to eliminate the economic loss caused by the formation of the aforementioned mixture of halogenated hydrocarbons and, in fact, to convert it into an economic gain. A still further object of this invention is to provide a process for the conversion of polybromomethanes, either singly or in mixtures thereof, into a useful and salable product. This invention achieves these objectives by providing a process for the production of ammonium bromide from bromoform and carbon tetrabromide, either singly or in mixtures thereof, including the above mentioned mixture of halomethanes obtained in the sodium bromite process, or any other mixture of polyhalomethanes which consists primarily of polybromomethanes but which may differ somewhat in composition from the mixture obtained in the sodium bromite process.

In the commercial manufacture of alkali metal bromites and alkaline earth metal bromites, a hypobromite solution is maintained at a suitable pH and low temperature to convert the hypobromite to bromite. It is advantageous to stop the reaction abruptly when the bromite concentration is at a maximum and to recover the bromite. The reaction is advantageously arrested by adjusting the pH to about 13 and the remaining hypobromite is decomposed by addition of ammonia or a methyl ketone. This procedure is described in U.S. Patent 3,095,267, columns 14–15 and the formation of bromoform is there explained. In the further recovery of the bromite, the bromoform is separated and the aqueous bromite liquor is worked up. Advantageously, to remove remaining traces of bromoform and other organic by-products, the aqueous liquor is extracted, suitably with carbon tetrachloride and the extracts are combined with the bromoform. Lesser amounts of other polyhalomethanes are present in this mixture including carbon tetrabromide (presumably formed by the reaction of hypobromite with bromoform), chlorotribromomethane (presumably formed by the reaction of hypochlorite with bromoform) and carbon tetrachloride when used as an extracting solvent.

When the polybromomethane mixture is separated from the bromite liquor by extraction with carbon tetrachloride, the latter is advantageously distilled from the higher boiling polybromomethane mixture and recycled. For the purposes of this invention, the polybromomethane mixture may contain residual amounts of carbon tetrachloride and the resulting ammonium bromide may contain minor amounts of ammonium chloride.

In the present specification and claims the term "polybromomethanes" is used to mean any of the polybromomethanes, singly or in mixtures, having 3 or more bromine atoms per carbon atom, including bromoform, carbon tetrabromide, chlorotribromomethane and including the above mentioned mixtures of halomethanes which consist largely of bromoform and carbon tetrabromide with minor amounts of carbon tetrachloride. The term ammonium bromide is used to mean pure ammonium bromide or a product which is largely ammonium bromide but which contains minor amounts of ammonium chloride.

The objectives of this invention are acihieved by reacting polybromomethanes with aqueous ammonia at elevated temperatures and pressures, under which conditions the polybromomethanes are converted substantially quantitatively to ammonium bromide. It is a surprising and advantageous feature of this process that, under the recommended conditions of reaction, the only co-product is carbon monoxide which, being gaseous, is easily removed by venting, leaving a reaction mixture that is essentially pure ammonium bromide in water. The solution requires no further purification and can be employed as such or evaporated to dryness to give substantially pure crystalline ammonium bromide. For those applications in which small quantities of ammonium chloride in the ammonium bromide might be objectionable, it is preferable to use polybromomethanes containing no chlorinated or bromochlorinated methanes. For all other applications, it is satisfactory to use polybromomethanes containing small amounts of the chlorinated substances.

Furthermore, if desired, ammonium bromide is suitably purified, with respect to ammonium chloride, by recrystallization.

In another embodiment of this invention, elemental bromine is recovered in any suitable manner from the ammonium bromide and recycled to the bromite producing operation. Direct chlorination of the ammonium bromide liquor to recover bromine is not feasible due to the formation of chloroamines and nitrogen trichloride. Suitably, however, the ammonium bromide liquor is heated with an excess of caustic alkali, for example, caustic soda or lime to remove and recover ammonia and to form aqueous sodium or calcium bromide. Chlorination of the aqueous bromide, preferably neutralized to pH 7 is acomplished by introducing chlorine thereinto. Chlorine gas, diluted if desired with air or nitrogen, is most convenient. Other sources of chlorine active to liberate bromine from bromides are suitable including, for example, sodium hypochlorite solutions, bleach liquor or calcium hypochlorite, solid or in solution. Appropriately the liquor is heated during or after addition of chlorine or both and bromine is distilled overhead. A stream of air or other inert gas aids in removing the liberated bromine. The bromine vapors are passed directly to the bromite producing process or the bromine is condensed as liquid bromine and stored for later re-use. Recovery of bromine is ordinarily about 90 to 95 percent. The residual liquor is a solution of salt and/or hydrochloric acid and is discarded.

As long as elemental bromine is cheaper than the same weight of bromine in the form of ammonium bromide and the ammonium bromide is salable, it is preferable to sell recovered ammonium bromide and buy bromine, crediting the differential to the bromite producing process. As the prices of bromine and ammonium bromide change and in some special circumstances, the bromine recovery and recycle processes are particularly advantageous.

To convert the bromine content of the polybromomethanes completely to ammonium bromide by the process of this invention, it is necessary to provide at least one mole of ammonia per bromine atom. Since the by-product bromomethanes contain some chlorine substituents, it is necessary, in general to provide at least one mole of ammonia per halogen (bromine or chlorine) atom. For the sake of speed and completeness of reaction, it is preferable to use a higher molar ratio of ammonia to halogen, for example, a ratio of 20:1 or higher. For practical considerations, it is preferable to use a molar ratio of between 2:1 and 3:1.

In addition, it is necessary in the process of the present invention to use sufficient water to convert the carbon of the polybromomethanes (and any polychloromethanes) to carbon monoxide. The molar ratio of $H_2O$ to C is at least 1:1 and is usually much higher, e.g., up to 50:1. It is convenient to use commercial aqua ammonia of ca. 29% strength and since the molecular weights of ammonia and water are 17 and 18 respectively, the molar ratio of $H_2O:NH_3$ in such aqua ammonia is about 2.3:1. If at least one $NH_3$ per Br in the polybromomethanes is provided, an ample sufficiency of water is provided.

Upper limits on the water and ammonia are not critical and may be made convenient. Great excesses of ammonia increase the pressure unnecessarily and great excesses of water unduly reduce the capacity of the equipment. Those skilled in the art will be able to choose any appropriate proportions of ammonia and water above the minimum requirements which are conveniently accommodated in the equipment available.

The process is suitably operated at super-atmospheric pressures, the upper limit of pressure being dictated mainly by considerations of equipment construction and cost. Pressures of about 80 to 250 p.s.i.g. are usually suitable. For an economic balance between reaction speed and equipment cost, it is preferable to operate at pressures between 100 and 250 p.s.i.g. Most advantageously, the process is operated under the autogenous pressure developed by the reactants and products themselves. The reaction pressure is the resultant of temperature and of proportions of ammonia, water and other components of the reaction mass. Alternatively, manual or automatic venting of the reactor serves to maintain the desired pressure.

The process of the invention is suitably operated at temperatures and pressures which are convenient in conventional pressure equipment and at convenient rates. Suitable temperatures are from about 80° C. to 200° C. but higher temperatures can also be used. At lower temperatures, the reaction rate may be inconveniently slow. Preferably the process is operated at about 100° to 200° C. and more specifically in the range of 135° to 175° C.

Under the conditions described, the reaction is usually complete in from one to eight hours but more extreme conditions of temperature and pressure accelerate the reaction rate and shorten the time required for complete conversions. Conditions too mild may inconveniently extend the reaction time. Determination of the most advantageous temperature and pressure to use in any given equipment to meet a prescribed time schedule is within ordinary skill.

EXAMPLE I

Twenty-five grams bromoform and 48 ml. of concentrated (ca. 29% by weight) aqueous ammonia were charged to a 300 ml. glass-lined autoclave and maintained at a temperature of 150° C. for 2 hours. The molar ratio of $NH_3:Br$ was 2.48:1. The autogenous pressure reached a maximum of 200 p.s.i.g. After completion of reaction, the charge was cooled to room temperature and the pressure released by venting. Analysis of the reaction gases by vapor phase chromatography and by mass spectrometry showed that carbon monoxide was the main constituent. The aqueous reaction mass was evaporated to dryness and the crystalline residue finally dried in an oven at 100° C. Analysis showed that the bromine in bromoform had been quantitatively converted to ammonium bromide of about 99% purity.

EXAMPLE II

Ten grams of carbon tetrabromide and 20 ml. concentrated aqueous ammonia were charged to a 300 ml. glass-lined autoclave and maintained at a temperature of 150° C. for 3 hours. The molar ratio of $NH_3:Br$ was 10:1. The autogenous pressure reached a maximum of 150 p.s.i.g. After completion of reaction, the product mixture was worked-up as in Example I. The yield of ammonium bromide was in excess of 95%.

EXAMPLE III

Twenty-five grams of polybromomethane mixture obtained from sodium bromite manufacture and having the following composition by weight, as determined by vapor phase chromatography:

|  | Percent |
|---|---|
| Bromoform | 76.3 |
| Carbon tetrabromide | 17.5 |
| Chlorotribromomethane | 4.9 |
| Carbon tetrachloride | 0.6 |
| Unidentified | 0.7 |
|  | 100.0 | was charged along with 48 ml. of a concentrated aqueous ammonia into a 300 ml. glass-lined autoclave and maintained at a temperature of 150° C. for 4 hours. The molar ratio of $NH_3:(Br$ plus $Cl)$ was 2.4:1. The autogenous pressure reached a maximum of 170 p.s.i.g. After completion of reaction, the product mixture was worked-up as in Example I. Conversion of the polybromomethane mixture was about 96%, giving a product that was substantially ammonium bromide containing a minor amount of ammonium chloride.

EXAMPLE IV

Two hundred sixty-two pounds of a polybromomethane mixture obtained from sodium bromite manufacture, and having the following composition by weight:

|  | Percent |
|---|---|
| Bromoform | 76.8 |
| Carbon tetrabromide | 17.3 |
| Chlorotribromomethane | 4.3 |
| Low boilers | 1.6 |
|  | 100.0 | was charged along with 550 pounds of 29% aqueous ammonia, providing a molar ratio of ammonia to bromine plus chlorine of 3.08:1, into a 150-gallon, glass-lined reactor and maintained at a temperature of 93° C. for eight hours. Through periodic venting, the pressure was not allowed to exceed 85 p.s.i.g., the safe working pressure of the vessel. After reaction, unreacted bromomethanes (40% of the initial charge) were recovered for recycle. The final product was an aqueous solution containing ca. 40% ammonium bromide with less than one percent ammonium chloride.

What is claimed is:

1. Process for producing ammonium bromide which comprises heating under a pressure of from 80 to 250 p.s.i.g. a mixture of at least one polybromomethane having at least 3 bromine atoms per carbon atom with aqueous ammonia, the molar ratio of $NH_3$ per halogen atom in said polybromomethane being at least 1:1 and the molar ratio of $H_2O$ per carbon atom in said polybromomethane being at least 1:1, at temperatures of from about 80° to 200° C., venting by-product carbon monoxide and recovering the ammonium bromide product.

2. Process as claimed in claim 1 in which the molar ratio of $NH_3$ per halogen atom is from 1:1 to 20:1.

3. Process as claimed in claim 1 in which the molar ratio of $H_2O$ to carbon is from 1:1 to 50:1.

4. Process as claimed in claim 1 in which the pressures are from 100 to 250 p.s.i.g.

5. Process as claimed in claim 1 in which the temperatures are from 100° to 200° C.

6. Process as claimed in claim 1 in which said polybromomethane is contained in a mixture of polyhalomethanes produced in the manufacture of a bromite.

7. Process as claimed in claim 1 in which said aqueous ammonia consists of about 29% $NH_3$ and 71% $H_2O$.

8. Process as claimed in claim 1 in which said temperature is from 135° to 175° C. and said pressure is from about 85 to 250 p.s.i.g.

9. In a process for producing a bromite selected from the class consisting of alkali metal bromites and alkaline earth metal bromites wherein a by-product mixture of polybromomethanes is separated from the principal bromite product, the improvement of reacting said polybromomethanes by the process as claimed in claim 1 to form an aqueous ammonium bromide product, adding thereto an excess of caustic alkali, distilling and recovering ammonia and the resulting bromide solution, chlorinating said resulting bromide solution to produce elemental bromine and separating said elemental bromine from residual liquor and returning said separated elemental bromine to the bromite-forming process.

References Cited

UNITED STATES PATENTS 1,814,822   7/1931   Britton et al. _____ 23—100 XR

EDWARD STERN, Primary Examiner

U.S. Cl. X.R.

23—100, 204